United States Patent [19]

Arai et al.

[11] Patent Number: 4,580,207

[45] Date of Patent: * Apr. 1, 1986

[54] NUMERICAL CONTROL DATA DIVIDING AND EDITING APPARATUS FOR NUMERICAL CONTROL MACHINE TOOL

[75] Inventors: Yoshinao Arai, Yokohama; Kenji Takeda, Kamakura, both of Japan

[73] Assignee: Hitachi, Ltd., Tokyo, Japan

[*] Notice: The portion of the term of this patent subsequent to Mar. 5, 2002 has been disclaimed.

[21] Appl. No.: 638,665

[22] Filed: Aug. 8, 1984

Related U.S. Application Data

[63] Continuation of Ser. No. 323,981, Nov. 23, 1981, abandoned.

[30] Foreign Application Priority Data

Nov. 25, 1980 [JP] Japan ............... 55-164595

[51] Int. Cl.$^4$ ............................................. G05B 19/42
[52] U.S. Cl. ................... 364/138; 364/131; 364/468; 364/474; 364/478; 364/900
[58] Field of Search ............... 364/200, 900, 474, 167, 364/131, 132, 138, 478, 468; 318/562

[56] References Cited

U.S. PATENT DOCUMENTS

| | | | |
|---|---|---|---|
| 3,576,540 | 4/1971 | Fair et al. | 364/167 |
| 3,626,385 | 12/1971 | Bouman | 318/562 |
| 3,668,653 | 6/1972 | Fair et al. | 364/900 |
| 3,959,775 | 5/1976 | Valassis et al. | 364/200 |
| 4,029,950 | 6/1977 | Haga | 364/474 |
| 4,069,488 | 1/1978 | Fiorenza | 364/200 |
| 4,100,597 | 7/1978 | Fleming et al. | 364/474 |
| 4,215,406 | 7/1980 | Gomola | 364/200 |
| 4,237,598 | 12/1980 | Williamson | 364/474 X |
| 4,249,243 | 2/1981 | Yoshida et al. | 364/474 |
| 4,251,858 | 2/1981 | Cambigue et al. | 364/200 |
| 4,281,379 | 7/1981 | Austin | 364/200 |
| 4,288,849 | 9/1981 | Yoshida et al. | 364/132 |
| 4,503,507 | 3/1985 | Takeda et al. | 364/131 |

OTHER PUBLICATIONS

"Flexible Manufacturing Systems," Hass, P. R., American Machinist, Dec. 1973, pp. 288-301.

"Direct Numerical Control (DNC) Interfacing with CAO/CAM", Gitto, P., Am. Inst. of Aeronautics, vol. 18, (1980), No. 3, New York, pp. 52-57.

Primary Examiner—Jerry Smith
Assistant Examiner—John R. Lastova
Attorney, Agent, or Firm—Antonelli, Terry & Wands

[57] ABSTRACT

Machining data for machining a workpiece is divided by an NC data dividing processor into a plurality of machining element data each of which can be carried out by a single tool, and selected ones of the divided machining element data are combined and edited by an NC data editing processor in accordance with job allocation determined by a job allocation processor.

6 Claims, 10 Drawing Figures

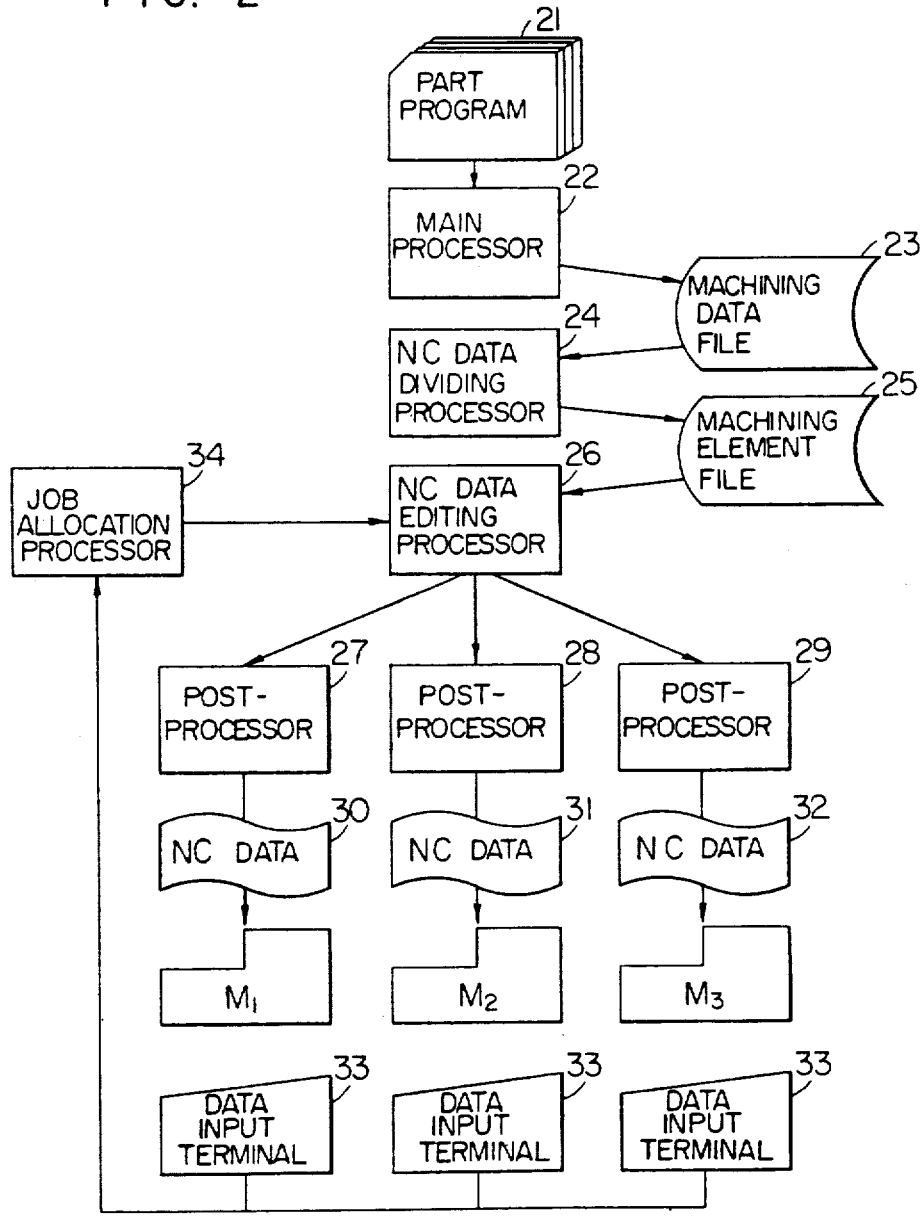

NUMERICAL CONTROL DATA DIVIDING AND EDITING APPARATUS FOR NUMERICAL CONTROL MACHINE TOOL

This is a continuation of application Ser. No. 323,981 filed Nov. 23, 1981 and now abandoned.

BACKGROUND OF THE INVENTION

1. Field of the Invention

The present invention relates to a numerical control data dividing and editing apparatus which can rapidly edit numerical control data for controlling operation of a numerical control machine tool.

2. Description of the Prior Art

In recent years, many composite machine tools such as machining centers and turning centers have been introduced into machine tool workshops. These machine tools contribute to an improvement of efficiency in productivity because of their many functions which prior art single-function machine tools did not have.

FIG. 1 shows a perspective view of such a machine tool workshop which comprises three numerical control (NC) machine tools $M_1$–$M_3$, numerical control units 1–3 associated with respective NC machine tools, an automated cart 4, a stocker 5 and a control computer 6. The NC machine tools $M_1$–$M_3$ have automatic tool changers (ATC) 7–9, respectively, which automatically exchange tools in accordance with instructions from the associated NC units 1–3, and automatic pallet changers (APC) 11–13 which automatically exchange pallets 10 on which workpieces are mounted.

An outline of machining operation in the machine tool workshop is now explained. A workpiece mounted on the stocker 5 is conveyed to the machine ($M_1$–$M_3$) by which it is to be machined, by the automated cart 4 and set to the APC (11–13). When the machining operation of the workpiece being machined by the machines ($M_1$–$M_3$) is completed, the APC (11–13) is automatically moved so that the conveyed workpiece is set to the machine and the NC data necessary for that workpiece is supplied from the control computer 6 and the machining operation starts. The workpiece machined by the machine is returned to the stocker 5 by the automated cart 4. In this manner, the workpieces mounted on the stocker 5 are sequentially machined.

On the other hand, in editing the NC data, automatic program languages such as APT (automatically programmed tools) and EXAPT (extended subset of APT) are used. In this system, a part programmer writes a part program in accordance with a design drawing, which program is then executed by an automatic programming apparatus to generate necessary NC data. In writing the part program, the programmer assumes a particular machine tool for machining particular parts and a particular NC unit.

Since the NC machine tools $M_1$–$M_3$ can carry out various machining operations, several alternatives may exist for the machine tool used and the sequence of operations thereof to machine a given workpiece. In order to attain an effective operation of the workshop, it is desirable to instantly allot proper jobs depending on conditions of the field such as a variation of types of workpieces, presence of an urgently required workpiece, overload or underload conditions, failure of machine tool and breakage of a tool.

In the prior art NC data editing system, however, when the machining steps or the machine tools used are changed, the part program must be rewritten in order to get the necessary NC data. This takes a long time.

SUMMARY OF THE INVENTION

It is an object of the present invention to provide an NC data editing apparatus for an NC machine tool which enables job allocation for each machining element and allows instant editing of necessary NC data.

According to a feature of the present invention, there are provided an NC data dividing processor which divides tool location data from an output of a main processor by machining element, and an NC data editing processor which combines and edits the divided subdata in accordance with a current condition of the workshop.

Consequently, once a part program has been written without fixing a machine tool and an NC unit to a particular workpiece, the NC data can be instantly obtained when the job allocation is changed in accordance with the condition of the workshop. Accordingly, the utilization factor of the facilities is improved, part read time is reduced and hence a productivity is improved.

BRIEF DESCRIPTION OF THE DRAWINGS

FIG. 2 is a block diagram of a machine tool workshop which uses an NC data dividing and editing apparatus of the present invention.

DESCRIPTION OF THE PREFERRED EMBODIEMTNS

Figure 1:
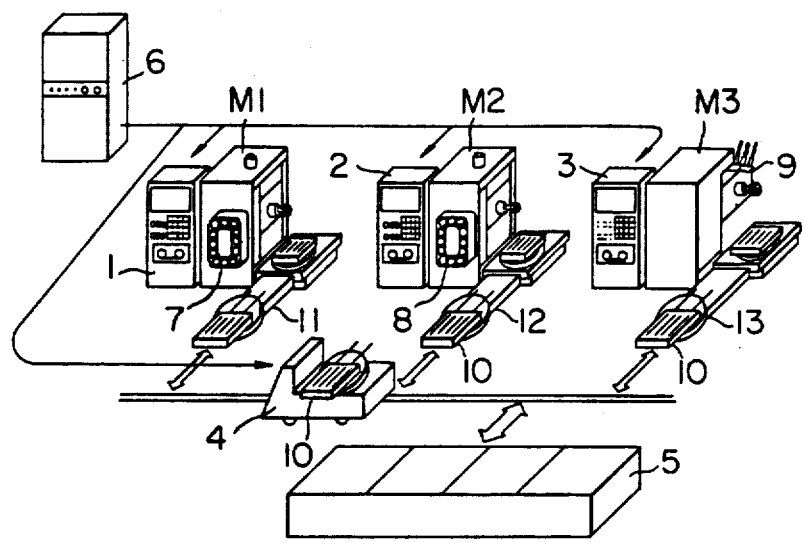
FIG. 1 is a perspective view of a known machine tool workshop.

Referring to FIGS. 2 through 8, the preferred embodiments of the present invention will be explained.

Definition of Terms

Before the description of the preferred embodiments, the terms used herein are defined as follows:

(1) Machining element . . . A minimum unit for allocating a job to the machine. That is to say, the machining element is defined as a job which can be carried out by one tool. NC data for the machining element is called a maching element data. Data for specifying a tool used for the machining element is referred to as "tool specifying data".

(2) Job precedence relation . . . A relation between a machining element to be currently carried out (preceded machining element) and a machine element to be carried out prior to the current machining element (preceding machining element). For example, in a tapping job, drilling is a preceding machining element to tapping. Machining steps to reduce flash can also be represented by the job precedence relation.

(3) Job set . . . A set of sequenced machining elements for a job allotted to a machine in accordance with load, scheduling and utilization factor.

(4) Record . . . NC data, and tool path information and command information for the functions of the machine, which are temporarily stored in a memory to develop the NC data. It is classified to a definition sentence or an operation data.

(5) Definition sentence . . . It defines a name of part program, a machine used and a tool used.

(6) Operation data . . . It specifies an operation of the tool and includes tool movement direction data, speed data and stop data (these data being operation data in a narrow sense). It may also include data for position of tool exchange, rotation angle of a table carrying a workpiece, clearance between a tip end of the tool and the workpiece, type of cutting agent and on/off condition of cutting agent (these data being condition data). Thus, the operation data includes the operation data in a narrow sense and the condition data. Of the condition data, those which are used to establish initial values for each machining element are called "start condition data" and those which are used to establish values at the end of the operation in each machining element are called "end condition data".

DESCRIPTION OF EMBODIMENTS

FIG. 2 shows an overall configuration of a jobstop type machine tool workshop having NC machine tools $M_1$-$M_3$ to which the present invention is applied. A part program 21 written in accordance with a design drawing without specifying particular machine tool and NC unit is executed by a main processor 22 of an automatic programming apparatus and a series of data for first through final machining steps are stored in a machining a data file 23.

A NC data dividing processor 24, which is one feature of the present invention, divides the machining data into machining elements one for each tool used and stores the machining elements in a machining element file 25. On the other hand, a job allocation processor 34 reads in or senses information on the conditions of the workshop by sensors or data input terminals 33 and also reads in, though not particularly shown in FIG. 2, information on job precedence relations among the machining elements for each machining data for a workpiece, this information being, for example, manually inputted via a CRT termianl coupled to the job allocation processor 34. Thus, the job allocation processor 34 determines the job allocation in accordance these pieces of information and instructs editing to an NC data editing processor 26.

The NC data editing processor 26, which is another feature of the present invention, combines and edits a predetermined set of machining elements for each machine tool. Post-processors 27-29 individually assigned to a different one each of the machine tools process the edited machining elements to generate NC data 30-32 to be processed in the machine tools $M_1$-$M_3$.

NC Data Dividing Process

Figure 3:
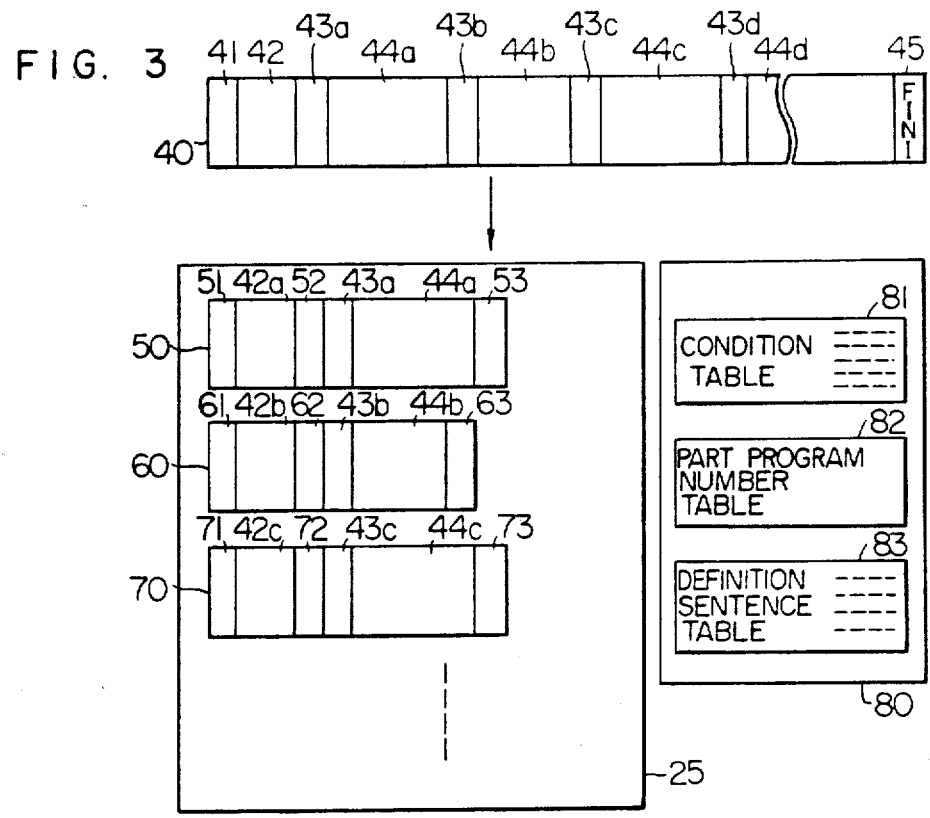
FIGS. 3 and 4 show a data format and a flow chart for explaining an operation of an NC data dividing processor shown in FIG. 2.
Figure 4:
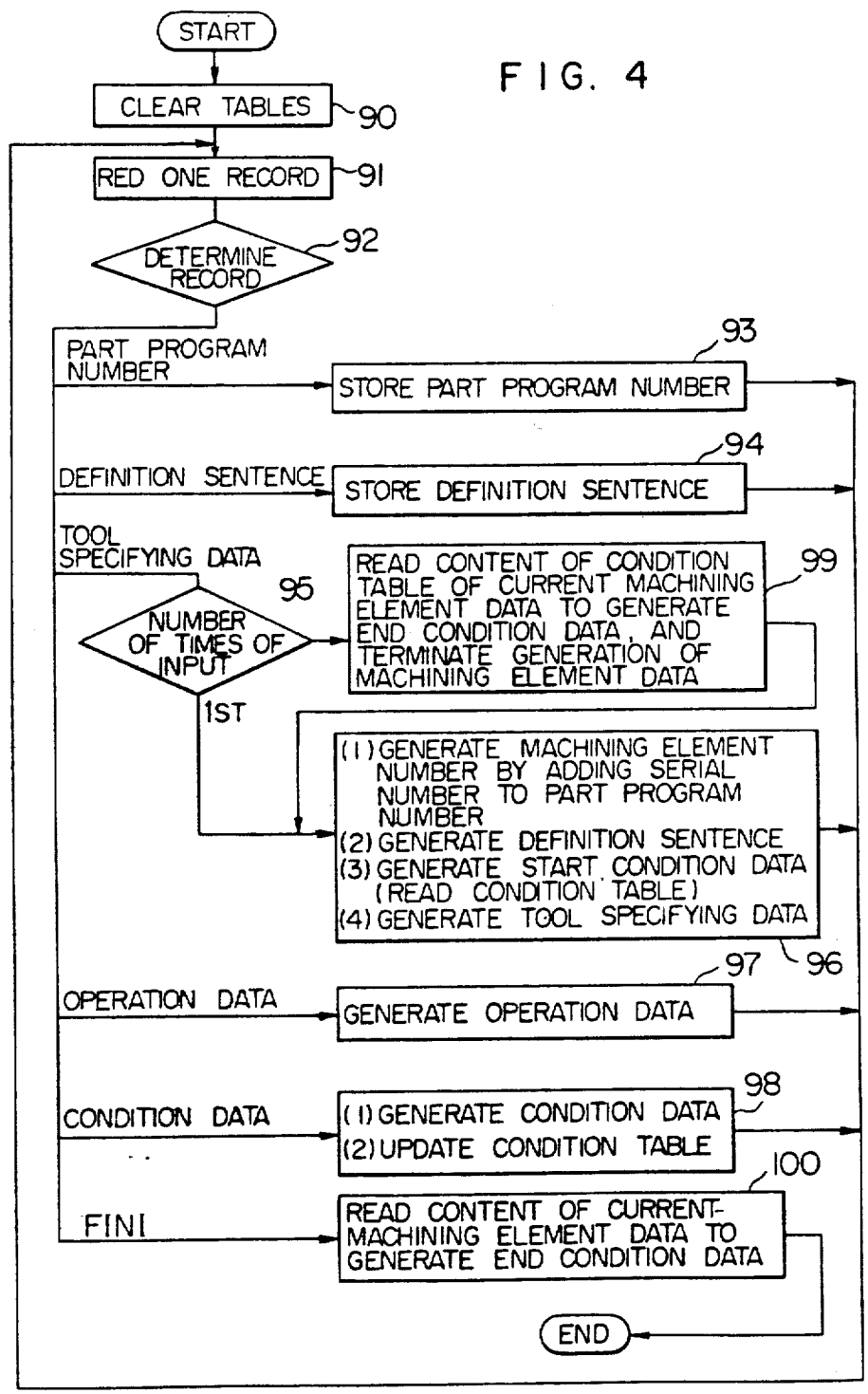

Referring to a data format of FIG. 3 and a flow chart of FIG. 4, the operation of the NC data dividing processor 24 is now explained. As shown at the top of FIG. 3, a machining data 40 necessary to machine a given workpiece comprises a part program number 41 for the workpiece, a definition sequence 42, a plurality of sets of tool specifying data 43a, 43b, 43c, 43d, . . . , operation data 44a, 44b, 44c, 44d, . . . including operations and conditions of the specified tools, and a FINI code 45 which indicates an end (a finish) of data. The plurality of sets of tools specifying data and the plurality of sets of operation data are included because a plurality of tools are usually used to machine one workpiece.

The NC data dividing processor 24 divides the machining data 40 for the workpiece into machining element data each of which can be handled by one tool and stores the machining element data as the machining element file 25 in a memory such as a disc or drum. The machining element data are shown by 50, 60 and 70 in the lefthand part of FIG. 3. Each of the machining element data 50, 60 and 70 includes a machining element number, a definition sentence, a start condition data, a tool specifying data, an operation data and an end condition data.

A manner of dividing the machining data 40 shown in FIG. 3 to develop the machining element data 50, 60, 70, . . . is now explained with reference to FIG. 4.

Numeral 80 shown on the righthand part of FIG. 3 denotes a memory area which includes a condition table 81, a part program number table 82 and a definition sentence table 83. It may be a portion of the memory in which the machining element file 25 is stored or a portion of a memory contained in the NC data dividing processor 24.

When the data 41–45 of the machining data 40 are to be read, the tables 81–83 in the memory area 80 are cleared in a step 90. In steps 91 and 92, the machining data 40 is read one record at a time and the read records are discriminated. Depending on the result of the discrimination, each data is processed in one of steps 93, 94, 95, 97 and 98.

More specifically, the part program number 41, for example, "P0001" is read, which is stored in the table 82 in the memory area 80 in the step 93.

The definition sentence 42 is stored in the table 83 in the memory area 80 in the step 94.

In the step 95, the tool specifying data 43a is checked for the number of times of input of the tool specifying data. Since it is a first input of the tool specifying data, the data 43a is processed in the step 96. In the step 96, a serial number is first added to the part program number 41 "P0001" stored in the table 82 to develop a machining element number 51, for example "P0001-1". The machining element number 51 is stored in a first stage of the machining element file 25. Secondly, the definition sequence 42 stored in the table 43 is stored as the definition sentence 42a following to the machining element number 51. Thirdly, the condition data stored in the table 81 is stored as the start condition data 52 following to the definition sequence 42a. Fourthly, the incoming tool specifying data 43a is stored following to the start condition data 52.

The operation data 44a includes a plurality of records each comprising the pure tool operation data and the condition data for specifying the machining conditions as described above. The operation data and the condition data are discriminated one record at a time in the step 92 and processed in the step 97 or 98. In the step 97, the operation data is generated and stored following to the tool specifying data 43a. In the step 98, the condition data is generated and stored following the operation data. The condition data updates the content of the condition table 81 in the memory area 80. The operation data 44a of the machining data 40 is shifted to follow the tool specifying data 43a of the machining element data 50 and the content of the table 81 is updated each time when the condition data is extracted.

The tool specifying data 43b next is read in the step 95. Since this tool specifying data is a second input following the previous tool specifying data 43a, the tool specifying data 43b is processed in a step 99. In the step 99, the content of the condition table 81 updated in the previous steps is generated as the end condition data for the first machining element and added to the end of the machining element data 50 as the end condition data 53. This completes the generation of the first machining element data 50.

The end of the generation of the first machining element data 50 starts the generation of the second machining element data 60. The step 96 is carried out following to the step 99.

In the step 96, like in the case of the first machining element data 50, the machining element number 61, the definition sentence 42b, the start condition data 62 and the tool specifying data 43b are generated, and they are contiguously stored in the second stage of the machine element file 25. The content of the table 81 is stored as the start condition data 62 and the second tool specifying data is stored as the tool specifying data 43b. In the same manner, the third machining element data 70 (71, 42c, 72, 43c, 73) and so on are sequentially generated.

Finally, when the FINI code 45 is read, the content of the condition table 81 is added to the end of the machining element data in the last stage as the end condition data. This completes the division of the machining data 40.

Job Allocation

The job allocation processor 34 allocates the jobs in accordance with the information from the sensors or the data input terminals 33, that is, the load conditions of the machine tools $M_1$, $M_2$ and $M_3$, the presence or absence of machine failure and the tool mount conditions, and information on the job precedence relations among the machining elements for each machining data for a workpiece, the job precedence relation information being, for example, inputted via a CRT terminal coupled to the job allocation processor 34, though not particularly shown in FIG. 2. Where a plurality of machine tools each having a plurality of tools are included, a well-known search theory such as BBM (Branch and Bound Method) or BP (Backtrack Programming) is used to determine a most efficient way to allocate particular jobs to a particular machine tool.

Figure 5:
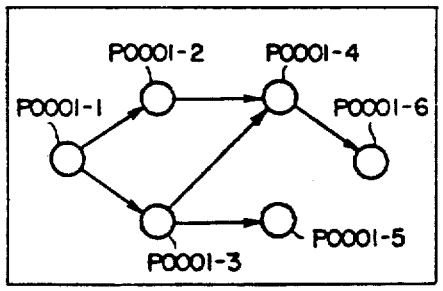
FIG. 5 shows a job precedence relation chart.

For example, let us assume that each workpiece requires six machining elements, the machine tools $M_1$, $M_2$ and $M_3$ have machining capabilities as shown in Table 1 and the job precedence relations among the machining elements are those as shown in FIG. 5. In Table 1, symbols O indicate the machining elements "P0001-1"-"P0001-6" each of which can be carried out by the machine tools $M_1$-$M_3$, and symbols X indicate those which cannot be carried out. Whether they can be carried out or cannot be carried out depends on whether the tools K102, K215, . . . for carrying out the machining elements are mounted on the machining tools or not. In Table 1, the rightmost column indicates the machining time of the machining element.

TABLE 1

| Machining Element Number | Tool Number | $M_1$ | $M_2$ | $M_3$ | Machining Time |
| --- | --- | --- | --- | --- | --- |
| P0001-1 | K102 | o | o | x | 40 min. |
| P0001-2 | K215 | x | o | o | 20 min. |
| P0001-3 | K008 | o | x | x | 40 min. |
| P0001-4 | K092 | o | x | o | 20 min. |
| P0001-5 | K114 | x | o | o | 30 min. |
| P0001-6 | K182 | x | o | o | 30 min. |

The arrows in the job precedence relation chart of FIG. 5 indicate that the machining element P0001-4, for example, cannot be carried out until after the machining elements P0001-2 and P0001-3 have been carried out.

Figure 6B:
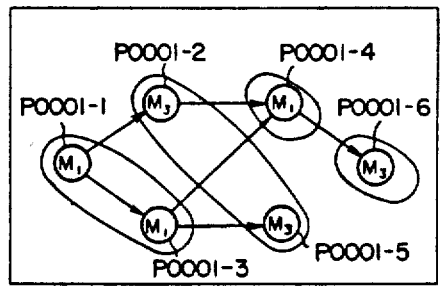
FIGS. 6A, 6B and 6C show job allocation charts.
Figure 6A:
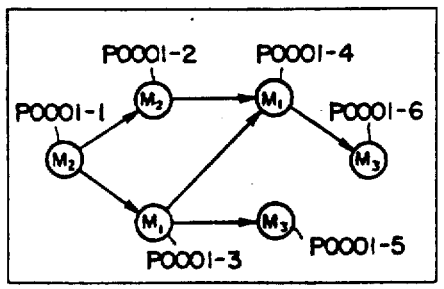

The information shown in Table 1 and FIG. 5 is applied to the job allocation processor 34 from the sensors or data input terminals 33 and from a CRT terminal or the like coupled to the job allocation processor 34 (though no particularly shown in FIG. 2) and the job allocation processor 34 allocates the jobs to the respective machine tools $M_1$-$M_3$ in accordance with the well-known search theory. In the illustrated example, when the machine tool $M_2$ carries out the machining elements P0001-1 and P0001-2, the machine tool $M_1$ carries out the machining elmenets P0001-3 and P0001-4 and the machine tool $M_3$ carries out the machining elements P0001-5 and P0001-6, the machining times of the respective machine tools are 60 minutes and the work can be done in a most efficient way. FIG. 6A shows a job allocation chart in which the machine tool numbers are shown in circles O.

Let us now assume that the machine tool $M_2$ fails. In this case, the jobs allocated to the machine tool $M_2$ have to be allocated to the machine tools $M_1$ and $M_3$ and the machining times of the machine tools $M_1$ and $M_3$ have to be changed.

For a sake of simplicity, by replacing the symbols O for the machine tool $M_2$ shown in Table 1 by the symbols X, the machining elements which can be carried out only by the machine tools $M_1$ and $M_3$ are automatically as shown in Table 2.

TABLE 2

| Machine Tool | Machining Element Number | Machining Time |
| --- | --- | --- |
| $M_1$ | P0001-1, P0001-3 | 80 min. |
| $M_3$ | P0001-2, P0001-5, P0001-6 | 80 min. |

Figure 6C:
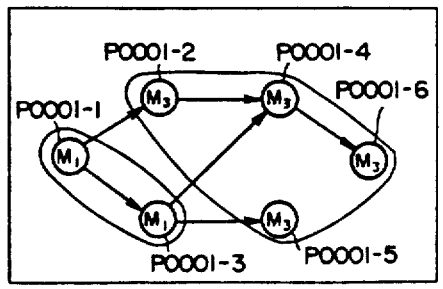

The machining times of the machine tools $M_1$ and $M_3$ are 80 minutes, respectively, and the remaining machining element P0001-4 may be allocated to either one of the machine tools $M_1$ and $M_3$. However, the number of times of transfer of the workpiece from the machine tool to another machine tool must be considered here. The longer the time required for the transfer is, the more important factor it is. FIGS. 6B and 6C show job allocation charts when the machining element P0001-4 is allocated to the machine tool $M_1$ and the machine tool $M_3$, respectively. As is seen from FIGS. 6B and 6C, the allocation of FIG. 6C which has a smaller number of times of transfer of the workpiece is more advantageous than the allocation of FIG. 6B.

NC Data Editing Process

Figure 7:
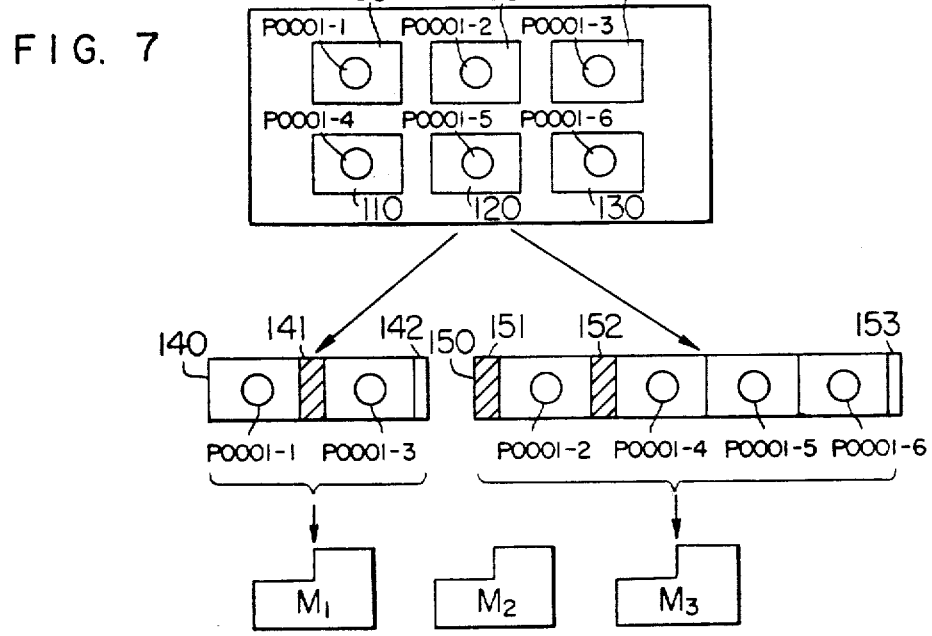
FIGS. 7 and 8 show a data format and a flow chart for explaining an operation of an NC data editing processor shown in FIG. 2.
Figure 8:
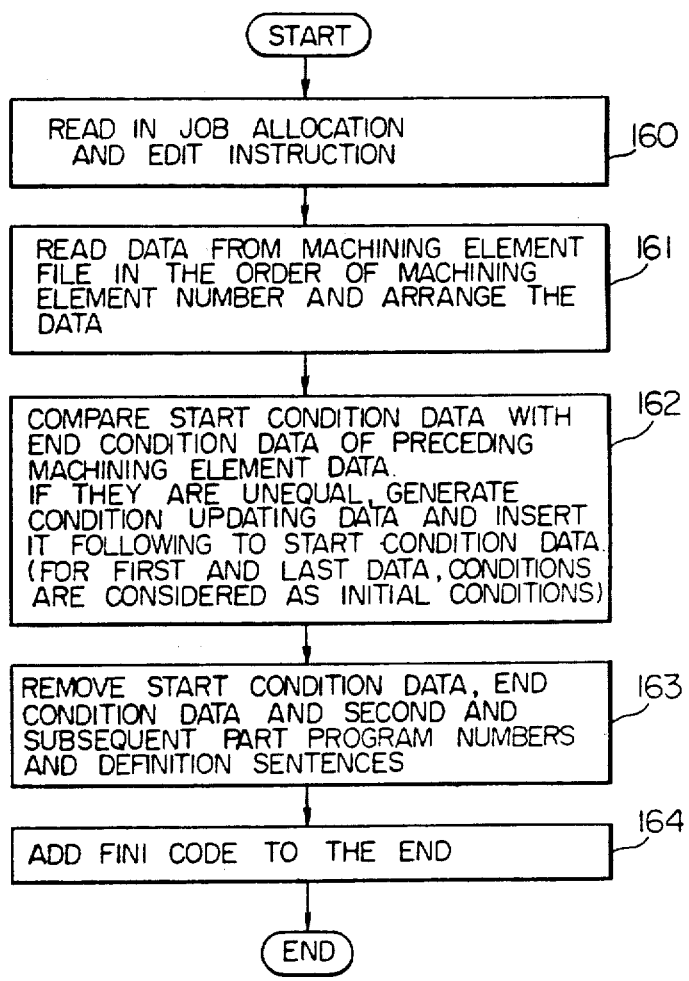

The edition of the NC data is carried out in the NC data editing processor 26 in accordance with the job allocation instruction from the job allocation processor 34. FIG. 7 shows an example of editing and FIG. 8 shows a flow chart of the NC data editing processor 26 for carrying out the editing.

At the top of FIG. 7, six machining elements 50, 60, 70, 110, 120 and 130 divided by the dividing process as shown in FIG. 3 are shown. The respective machining element numbers correspond to those shown in Table 1. An example of the editing process is explained below for a case of the failure of the machine tool $M_2$ as is the case of FIG. 6C.

The NC data for the machine tool $M_1$ is edited from the machining element data 50 and 70, and the NC data for the machine tool $M_3$ is edited from the machining element data 60, 110, 120 and 130. As the machine tool $M_2$ fails, failure information is supplied to the job allocation processor 34 from the sensor or data input terminal 33 associated with the machine tool $M_2$. The job allocation processor 34 then allocates the jobs in a manner described above and supplies the result of the job allocation and an edit instruction to the NC data editing processor 26. In a step 160, the NC data editing processor 26 reads in the result of the job allocation and the edit instruction. In a step 161, the NC data editing processor 26 reads predetermined machining element data (a job set 140 comprising the machining element data 50 and 70 and a job set 150 comprising the machining element data 60, 110, 120 and 130) from the machining elmeent file 25 shown in FIGS. 2 and 3 and arranges them.

The first job set 140 is explained below. In a step 162, the start condition data of the machining element data 50 and the end condition data of the immediately preceding machining element data are compared. Since no data is present preceding the machining element data 50, the end condition data is set as an initial condition data.

Next, the start condition data of the machining element data 70 and the end condition 53 of the immediately preceding machining element data 50 are compared. If they are not equal, the unequal data is inserted as a condition updating data 141 following to the start condition data 72, where a number of machining elements are included in one job set, the condition updating data are sequentially inserted.

Thereafter, in a step 163, the start condition data 52, 72, the end condition 53, 73, the second and subsequent part program numbers 71 and definition sentences 42a are removed.

In a step 164, the FINI code 142 is added to the end of the data to complete the machining data 140 of the first job set.

The second job set is similarly processed and the condition updating data 151 and 152 are inserted and the FINI code 153 is added to complete the machining data 150 of the second job set.

As can be understood from the above description, the start condition data and the end condition data are advantageously provided because editing of machining element data is carried out at a high speed due to the fact that provision of the start and end condition data makes it unnecessary to investigate the whole of each machining data for performing editing.

Advantage of the Present Invention

The machining data 40 may be divided into the machining element data in various ways. For example, the machining element data may comprise the start condition data 52, 62, 72, . . . , the tool specifying data 43a, 43b, 43c, . . . , the operation data 44a, 44b, 44c, . . . and the end condition data 53, 63, 73, . . . , and the part program numbers and the definition sentences may be stored in a separate file. In this case, the editing process is simplified.

The NC data dividing and editing apparatus of the present invention can be used to improve a line balance in a transfer line for combined production.

In an operatorless automated machining system, the present apparatus can be used to allocate the jobs for machines having fixed tools in order to improve a load balance. When a tool on a machine tool is broken during the machining operation, the operation can be continued by using the same tool on the other machine tool if it is mounted on the other machine tool.

While the present embodiment has been shown and described with reference to the NC machine tools, the present apparatus can be applied to a robot assembly work by replacing the tools by machine hands of a robot. Accordingly, the term machining operation includes the assembly work and the term machine tool includes the industrial robot.

As described above, according to the present invention, since the NC data can be generated by combining the machining elements each of which can be carried out by one tool, the jobs can be allocated in the unit of the machining element for the variable condition of the workshop Accordingly, the present invention is advantageous in improving the production efficiency such as improvement of a utilization factor of the facilities and reduction of a part read time.

We claim:

1. A NC data dividing and editing apparatus for a NC machine tool system including a plurality of NC machine tools having their operations controlled by NC data, comprising:

a NC data dividing processor for dividing a series of machining data derived by processing a part program by a main processor into a plurality of machining element data each of which can be carried out by a single tool, and for storing said machining element data, each of said plurality of machining element data including start condition data, tool specifying data, operation data and end condition data;

a job allocation processor for allocating jobs to said machine tools in response to information received from each machine tool conveying if the machine tool is continuing to operate, load conditions of tools on each machine tool, mounting conditions of tools on each machine tool and job precedence relations of said machining element data as a function of the machining time for each machine tool and the number of times of transfer of a workpiece between machine tools to accomplish said jobs to be allocated by said job allocation processor; and a NC data editing processor responsive to the job allocation by said job allocation processor for combining and editing selected ones of said plurality of machining element data divided by said NC data dividing processor for each of said machining tools and for reallocating one or more machining element data originally allocated to one or more machine tools by said job allocation processor to one or more additional machine tools on the basis of an updating of said information used for originally allocating information to said machine tools.

2. A NC data dividing and editing apparatus for a NC machine tool system including a plurality of NC machine tools having their operations controlled by NC data, comprising:

a NC data dividing processor for dividing a series of machining data derived by processing a part program by a main processor into a plurality of machining element data each of which can be carried out by a single tool, and for storing said machining element data, each of said plurality of machining element data including start condition data, tool specifying data, operation data and end condition data;

a job allocation processor for allocating jobs to said machine tools in response to information received from each machine tool conveying if the tool is continuing to operate, load conditions of tools on each machine tool, mounting conditions of tools on each machine tool and job precedence relations of said machining element data as a function of the machining time for each machine tool and the number of times of transfer of a workpiece between machining tools to accomplish said jobs to be allocated by said job allocation processor; and a NC data editing processor responsive to the job allocation by said job allocation means for combining and editing selected ones of said plurality of machining element data divided by said NC data dividing processor for each of said machining tools, said NC data editing processor updating, when it combines and edits the selected ones of said machining element data divided by said NC data dividing processor, the start condition data of the machining element data in accordance with the end condition data of the immediately preceding machine element data.

3. A data editing apparatus for a machine tool system including a plurality of machine tools each numerically controlled by a processor and further including processors common to all of said machine tools comprising:

one of said common processors being a main processor wherein operations at the machine tools are carried out by control in accordance with prepared data obtained by processing a program list by said main processor;

another of said common processors being a job allocation processor which detects the actual operational states of all machine tools to be controlled, said operational state of each machine tool being a function of the operation of the machine tool, load conditions of tools on each machine tool, mounting conditions of tools on each machine tool and job precedence relations of said machining data for each machine tool and the number of times of transfer of a workpiece between machine tools to accomplish jobs to be allocated, said job allocation processor transmitting the actual operational states to a NC data editing processor which combines the operational states and the prepared data for the respective machine tools and transmits the combined operational states and the prepared data to the processors controlling said respective machine tools, said NC data editing processor also functioning to reallocate one or more machine element data allocated to one or more machine tools by said job allocation processor to one or more additional machine tools on the basis of an updating of said operational states used for originally allocating information to said machine tools; and a data dividing processor, disposed between said main processor and said data editing processor, which divides processing data delivered by said main processor into the machining element data capable of being handled by respectively one individual tool and passes the machining element data on to said data editing processor.

4. A data editing apparatus in accordance with claim 3 wherein said data editing processor functions to edit selected ones of said machining element data divided by said NC data dividing processor, by updating start condition data of the machining element data in accordance with end condition data of the immediately preceding machine element data.

5. An NC data dividing and editng apparatus according to claim 3, wherein said NC data dividing processor includes memory means for storing said plurality of machine element data, said memory means including a memory area for storing at least start condition data, end condition data and operation data for the tools used to carry out said machining element data.

6. An NC data dividing and editing apparatus according to claim 5, wherein said end condition data is updated each time when condition data contained in said operation data is extracted.

* * * * *